US011860611B2

(12) United States Patent
Lutz

(10) Patent No.: US 11,860,611 B2
(45) Date of Patent: Jan. 2, 2024

(54) METHOD FOR IDENTIFYING A LIMITED OPERATOR CONTROL AND MONITORING OF A TECHNICAL PLANT, OPERATOR CONTROL AND MONITORING SYSTEM AND PROCESS CONTROL SYSTEM

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 20 days.

(21) Appl. No.: 17/826,270

(22) Filed: May 27, 2022

(65) Prior Publication Data
US 2022/0382260 A1  Dec. 1, 2022

(30) Foreign Application Priority Data

May 31, 2021  (EP) ..................................... 21176905

(51) Int. Cl.
*G05B 23/02*  (2006.01)
*G05B 19/418*  (2006.01)

(52) U.S. Cl.
CPC ..... *G05B 19/41865* (2013.01); *G05B 23/0267* (2013.01)

(58) Field of Classification Search
CPC .............. G05B 19/41865; G05B 23/0267
See application file for complete search history.

(56) References Cited

U.S. PATENT DOCUMENTS

| | | | |
|---|---|---|---|
| 2003/0167238 A1* | 9/2003 | Zeif .................... | G06Q 10/0639 705/400 |
| 2006/0069946 A1* | 3/2006 | Krajewski ........... | G06F 11/1658 714/4.1 |
| 2019/0137962 A1* | 5/2019 | Lutz ...................... | G06F 3/0482 |

FOREIGN PATENT DOCUMENTS

| | | |
|---|---|---|
| EP | 3104242 | 12/2016 |
| EP | 3276437 | 1/2018 |
| EP | 3480672 | 5/2019 |

OTHER PUBLICATIONS

Unknown: "Simatic Process Control System PCS 7 V7.0 SPI. Fault-tolerant Process Control System. Configuration Manual"; 30. , pp. 1-226, Sep. 2007 (Sep. 30, 2007).
EP Search Report dated Dec. 1, 2021 based on EP21176905.4 filed May 31, 2021.

* cited by examiner

*Primary Examiner* — Michael W Choi
(74) *Attorney, Agent, or Firm* — Cozen O'Connor

(57) ABSTRACT

A method via which it is possible to identify a limited operator control is identified, monitoring of a technical plant is performed and in which a process is controlled via a process control system that includes at least two operator station servers and at least one operator station client, wherein process objects associated with the process are distributed to process images of different operator station servers of the process control system, where for process monitoring, a graphical user interface for displaying plant images with symbols associated with the process objects is provided on the operator station client.

18 Claims, 2 Drawing Sheets

Figure 1:
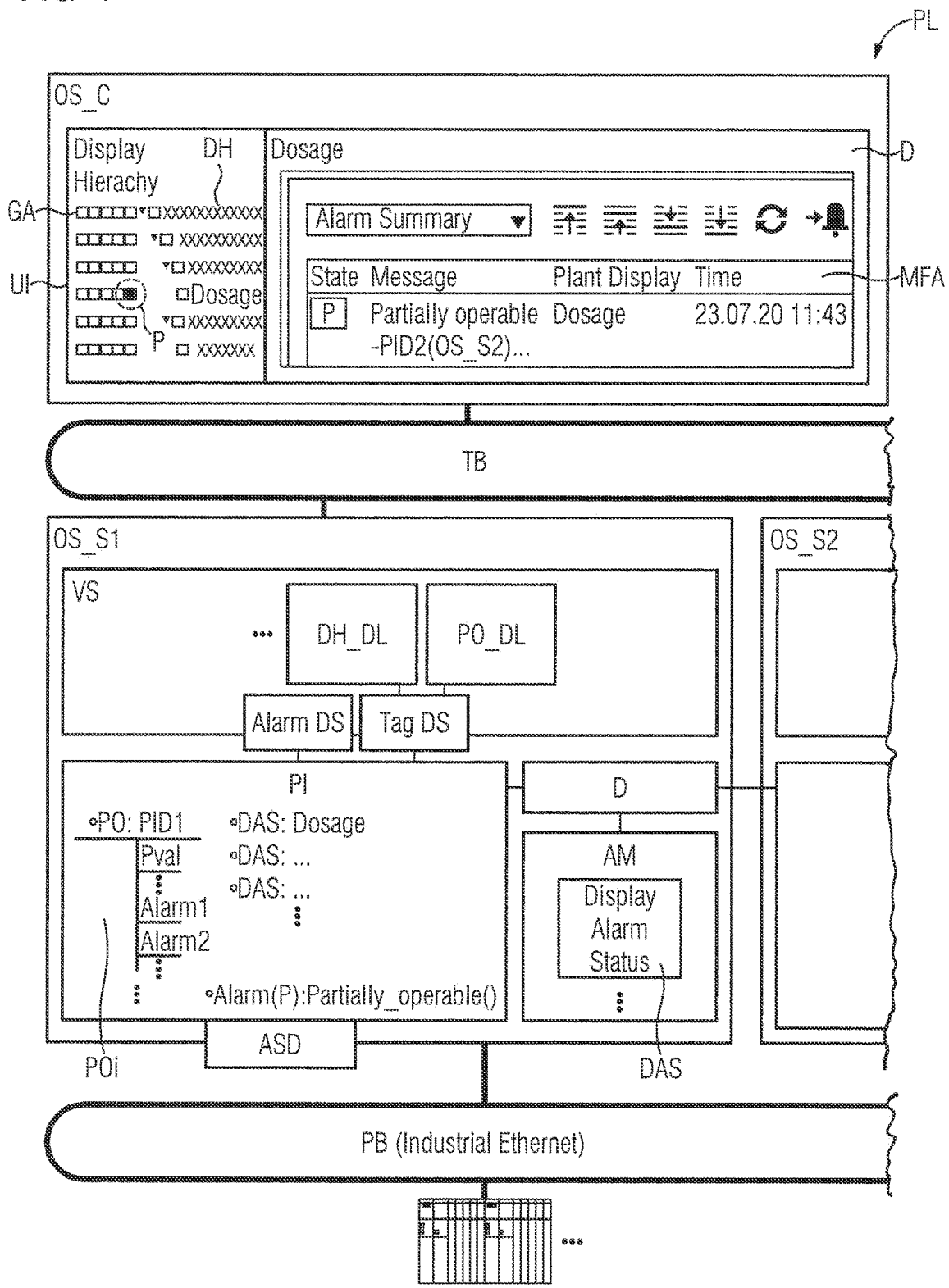

METHOD FOR IDENTIFYING A LIMITED OPERATOR CONTROL AND MONITORING OF A TECHNICAL PLANT, OPERATOR CONTROL AND MONITORING SYSTEM AND PROCESS CONTROL SYSTEM

BACKGROUND OF THE INVENTION

1. Field of the Invention

The invention relates to a method for operator control and monitoring of a technical plant that is to be controlled via a process control system including at least two operator station servers and at least one operator station client, and in which process objects associated with the process are distributed on process images of different operator station servers of the process control system and relates, moreover, to an operator control and monitoring system for a process control system that controls a process in a technical plant, having at least one client and at least two servers which are connected to one another via at least one communication device, where each operator station server has a process image that includes process objects associated with the process, and where for process monitoring a graphical user interface is provided on the operator station client for displaying plant images with (block) symbols that are associated with the process objects, and relates to a correspondingly suitable process control system.

2. Description of the Related Art

Plant images that illustrate in an abstracted manner the relationships (in particular between the individual functional units or components of the technical plant) are used for the operator control and monitoring of technical plants in which a process engineering-related process or a production process is carried out. The plant images are mainly illustrated on a client of a process control system. Plant images are compiled from different operator control and display elements. These include: static symbols (e.g., lines, and/or rectangles), dynamized symbols (for example, in dependence upon process values, lines with color change, and/or rectangles with fill levels), block symbols (for the dynamized visualization of process engineering-related process objects), complex control displays (for example, trend displays, and/or message sequence displays) and "containers" that represent closed image units in order to be able to visualize contents from independent and autonomous sources (for example, webcams, plant images of modular plant parts, so-called package units) or also "apps", i.e, autonomous applications, such as regulator optimizers or KPI calculations. Plant images are projected in the engineering, i.e., symbols, dynamizations and/or complex control displays, are positioned and their properties determined.

The block symbols illustrated in the plant images are supplied or dynamized by process values of "process objects" (POi, cf. FIG. 1) that are localized in a process image (PI, cf. FIG. 1) of an operator station server (OS_S, cf. FIG. 1) of the process control system. A process object corresponds to a functional component or unit of a process engineering-related plant or production plant and is always connected to a measuring site. Process objects include all components that can be operator controlled and monitored of a CFC plan (CFC=Continuous Function Chart) of a technical plant, such as a motor or a valve, objects for the automation, such as fill level regulations or motor controls, or objects for signal detection and signal processing. The computer-implemented process object that is localized in the process image is consequently always allocated to a technical object of the technical plant and operatively connected thereto. The term "dynamized" is used here as representative for a temporal change of the process values. This change can either be brought about by the process itself (temperature measurement value of a container changes) or by the operator (input: "heat the container to a temperature of 100° C.") As a consequence of any change, the plant image must be updated and a new image displayed.

In this case, the process objects can be distributed in the process images of different OS servers. This means that the block symbols of the plant images are also dynamized by process values of process objects that are localized in the process image of different operator station servers to that upon which the plant image itself is located. If an operator station server is unavailable, for example, as a result of a defect, maintenance or owing to projecting data being loaded and if this operator station server contains process values of process objects for dynamizing a plant image of a different operator station server, then the operator control and monitoring of this plant image is partially limited for the time period during which the server is unavailable. Although corresponding diagnostic information in the message sequence displays indicates the failure of operator station servers, it is however not apparent to an operator which effects this has on their operator control and monitoring in the context of the plant images and process objects that are available to the operator. Also corresponding navigation hierarchies do not include the plant images that are located on the failed operator station servers. The plant images of the available operator station servers remain unchanged but can only be operated to a limited extent because for dynamization they use process values from process objects that are included in the process image of an unavailable operator station server. It is not apparent to the operator which of their available plant images are affected after an operator station server becomes unavailable and which operator control and monitoring is limited. It is particularly problematic if the limited operator control and monitoring of a plant image is then only identified by an operator when the plant image is opened in order to implement the necessary operator control and monitoring.

SUMMARY OF THE INVENTION

In view of the foregoing, it is an object of the invention to provide a method via which an efficient and above all reliable operator control and monitoring of a technical plant that is to be controlled is realized, which renders it possible to perform the process in a safe and reliable manner.

Furthermore, it is an object of the invention to provide an operator control and monitoring system that is particularly suitable for performing the method for a process control system and to provide a corresponding process control system.

These and other objects are achieved in accordance with the invention by a method, an operator control and monitoring system and by a process control system where, via the method, it is possible to identify a partially limited operator control and monitoring of a technical plant, in which a technical process is controlled via a process control system. The process control system has at least two operator station servers and at least one operator station client, where process objects that are associated with the process are distributed in process images of different operator station servers of the process control system. For process monitoring, a graphical user interface for displaying plant images with symbols that are associated with the process objects is provided on the operator station client.

The inventive method includes determining, via a component of a first operator station server, whether a different operator station server of the process control system has failed. A failure of this server is reported to an alarm management component of the first operator station server. The alarm management component checks whether plant images that include process objects from the process image of the unavailable server are stored on the first operator station server and checks which plant images are affected by the server stoppage. In this case, an operator alarm is trigged which informs the operator that operator control of the affected plant image is limited. With a component that manages an alarm status of plant images, a separate tag that characterizes the alarm status of the affected plant image is updated in the process image of the first server and the operator alarm is displayed in conjunction with the affected plant image on the graphical user interface of the operator station client.

The advantage of the invention is that, in the absence of process objects on account of a server failure of the control system, the plant images that are affected thereby and can consequently only be partially operator controlled and monitored are determined via the method in accordance with the invention and also individually characterized. In this manner, while the process is being performed, an operator can identify directly which of the plant images that are available to them at the current moment in time can only be partially operator controlled and monitored without the operator having to explicitly select this. By the triggering of the operator alarm, the operator of the control system is informed and alerted, whereby the operator control and monitoring of the plant remains reliable and the technical plant also remains in a safe state, although as a result of the server failure a potentially dangerous situation could occur.

In one advantageous embodiment of the invention, so as to display the operator alarm on the graphical user interface of the client, the updated tag is reported in the case of the visualization service via a tag interface, and the operator alarm is taken into consideration via the component display hierarchy in all displays as an alarm of its own class. In this manner, operators can be informed at multiple sites in an operator station client regarding plant images that can only be partially operator controlled and monitored, even before the plant images are opened. The report is triggered by the updated DAS tag. Accordingly, the display is always up to date. This renders possible a particularly safe operator control and monitoring of the technical plant.

In one particularly advantageous embodiment of the invention, the operator alarm can be configured. The alarm for reporting a limited operator control and monitoring is stored as a type by the engineering in the process image. Here, the alarm attributes are also defined, such as affected process objects in the affected plant images. The alarm attributes can in this case be defined in an arbitrary manner. This renders possible a high degree of flexibility when providing the alarm.

In further advantageous embodiments of the invention, the operator alarm is displayed in a separate display or the display of the operator alarm is provided together with process alarms in group alarm displays or message sequence displays. This renders possible improved visibility of the operator alarm. An operator can more efficiently identify the limitation of the operator control.

In accordance with further advantageous embodiments, the tag of the alarm status of the affected plant image is updated in the process image at run time of the control system in real time or with each cycle or in an event-controlled manner. This renders possible a dynamic and adaptive adjustment of the operator control of the technical plant. During the engineering, it is possible to define how the operator alarm is to be configured.

In one further advantageous embodiment of the method, the respective status of the display alarm status (DAS) tag is stored in a time-dependent manner. In this manner, it is possible to advantageously determine time periods in which operator control is limited. Consequently, it is also possible to follow the history of the limited operator control and monitoring. In this context, it is possible to additionally store the process objects that have brought about a limited operator control, and/or to generate statistics regarding the process objects, process images and servers which have brought about a limited operator control. Such comprehensive context information can be input, for example, into a tool for quality assurance and can be used to control and record changes that have occurred in processes. It is thus possible to retrospectively intervene in the operator control of the technical plant after an operator alarm has occurred.

The method in accordance with the invention is preferably implemented in software or in a combination of software/hardware with the result that the invention also relates to an operator control and monitoring system and a process control system which are configured so as to perform a method of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE INVENTION

Figure 2:
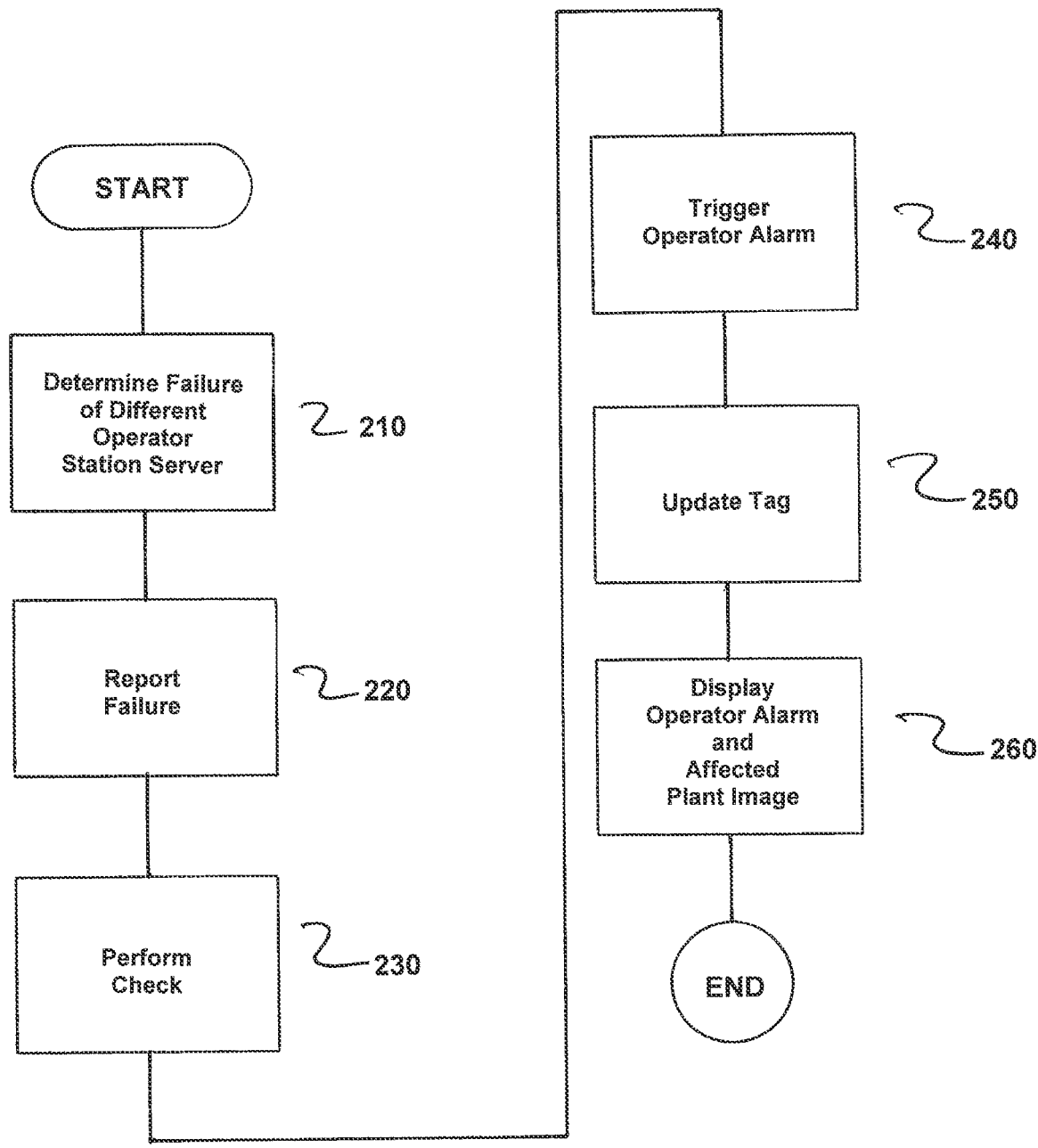

The invention and its embodiments are further described and explained below with the aid of a figure in which an exemplary embodiment of the invention is illustrated, in which:

FIG. 1 is a functional block diagram of a process control system for controlling a process having an operator station client and an operator station server with an indicated software architecture for implementing the method in accordance with the invention; and FIG. 2 is a flowchart of the method in accordance with the invention.

DETAILED DESCRIPTION OF THE EXEMPLARY EMBODIMENTS

FIG. 1 illustrates a functional block diagram of parts of a process control system PL for controlling a process engineering-related process or a production process in a technical plant. In the case of the technical plant, it can be a plant in the process industry, such as a chemical, pharmaceutical, petrochemical plant or a plant in the nutritional and luxury food industry. Moreover, the technical plant can be a plant for the production of goods, such as a factory with production lines.

These plants each have a process control system or at least one computer-supported module for controlling and regulating the process that is underway or the production. The process control system usually comprises sensors for determining measurement values and different actuators (not illustrated here). In addition, the control system comprises so-called process or production-related components, such as automation devices that are used to control the actuators or sensors. Furthermore, the control system has inter alia devices for operator control and monitoring and devices for visualizing the technical plant and devices for the engineering. The term "control system" includes in addition also further computing units for more complex regulations and systems for data storage and data processing.

FIG. 1 illustrates only a part of a process control system that includes essentially an operator control and monitoring system with its components, which in the present exemplary embodiment equates to an operator station client OS_C (shortened below to OS client), two operator station serves OS_S1 and OS_S2 (shortened below to OS server). The process control system PL can naturally have a multiplicity of OS clients, OS servers and automation devices AS, and/or field devices (not illustrated). The automation devices are connected, to the OS servers, on the one hand, via a plant bus PB, which is generally formed as an industrial Ethernet bus and, on the other hand, the automation devices are connected via at least one further bus (not illustrated here) to decentralized peripheries and a multiplicity of field devices (sensors, actuators) are connected to the peripheries.

For the operator control and monitoring, the OS client OS_C exchanges information and data with the OS servers OS_S1 and OS_S2 by way of a further bus system TB, which is described here as a terminal bus. The process control system is frequently configured such that it has at least one further component, such as an engineering work station (not illustrated here). In this case, it is a computer or server that is connected for data transfer to at least one of the communication systems TB and PB, and on which can be accessed likewise via a client of the operator control and monitoring system that comprises at least one OS server and at least one OS client. If required, even further computers or servers can be connected to the communication systems TB and PB.

In addition to parts of the just described hardware configuration of the process control system, FIG. 1 also illustrates parts of the software architecture for implementing the method in accordance with the invention in a simplified form. Thus, a multiplicity of functions for generating plant images and various displays are illustrated as software modules or software components (in this case in the form of rectangles, shortened to SW components). In contrast, different displays of a graphical user interface UI of the process control system PL are illustrated on the OS client.

The left-hand display of the graphical user interface displays a so-called image hierarchy DH in addition to a group alarm display GA. The image hierarchy DH is generated by a user via a suitable software of an engineering system (not illustrated here) of the process control system during the engineering phase and represents a technological view of the plant that is to be controlled. Structured nodes that are associated with the plant images, such as "dosage" are input or stored therein.

The respective plant images can be opened online, i.e., during the process control, because for process monitoring an operator selects in each case the corresponding plant image node of the image hierarchy or clicks thereon via a "mouse", as a result of which the plant image that is associated with the selected plant node is opened and displayed on the OS client. A plant image can comprise, for example, a graphical image symbol such as a tank or a pump and a block symbol that is associated with a process object, where the block symbol is provided for process monitoring and displays current process values, parameters and alarm identifications of this process object during process control.

As already mentioned, the block symbols can be dynamized in the plant images by process values of process objects that are localized in the process image of different OS servers to that upon which the plant image itself is located.

If such an OS server now fails or is not available, then the method in accordance with the invention nonetheless ensures a reliable operator control of the plant.

In the following exemplary embodiment, it is determined in a first step via the component D of the OS server OS_S1 whether a different OS server of the process control system PL has failed. The component D communicates with all the other OS servers and distributes all the information from a first OS server to all OS servers of the process control system and also receives back relevant information upon request (query). The component D can consequently also define the distribution of the process objects to other OS servers. If a plant image that is stored in the process image PI of OS_S1 requires a process object from a process image of a different OS server, then it requests the required process object via the component D. The component D, in turn, ensures that the process image PI of the first OS server can access the process object PO of the other OS server.

The process image PI of an OS server is a type of database in which all the data is managed, such as process values or alarms of the process objects that are received at run time of the technical plant. The computer-implemented process objects are each allocated to a technical object of the technical plant and are accordingly operatively connected thereto. The process object POi in FIG. 1 is provided with the identification "PO:PID1" and has a number of allocated parameters that are identified in the figure by "Pval", "Alarm 1", "Alarm 2" etc.

The alarms of the process objects continue to be operatively connected to the software component illustrated in FIG. 1 of the alarm manager AM, which in the illustrated exemplary embodiment is connected, on the one hand, to the process image PI and, on the other hand, is connected to the distribution component D. The alarm manager or the alarm management component AM makes a request either dependent upon time or in an event-controlled manner in the case of the process image PI to determine whether an alarm status of a process object that is allocated to the dedicated server, in this case to the OS server OS_SI has changed. Moreover, the alarm manager AM logs on in the case of the distribution component D to also be able to take into consideration the alarms from process objects of other OS servers. If a log-on fails (OS server not available), or if a running log-on is rejected (OS server failure), then it is not possible even in the event that the plant image is opened for the affected process objects to be operator controlled or monitored.

A failure of a different server is reported in this manner to the alarm management component of the first of the OS servers.

In a next step, the alarm management component checks whether plant images that include process objects from the process image of the failed server (OS_S2) are stored on the first OS server OS_S1 and checks which plant images are affected by the server failure.

This occurs with the aid of a so-called display alarm status tag (also referred to as a DAS tag). The tag used in this invention is a complex data structure that renders it possible to allocate additional properties or attributes to a data element in order to fulfill a specific purpose. In the case of the invention, a display alarm status tag (DAS tag) is stored for each plant image in the process image of an OS server and said tag represents the alarm status of the respective plant image. If an alarm of a process object occurs (or changes its status), then the software subcomponent display alarm status DAS of the alarm management component AM allocates this status to a defined plant image (i.e., to the plant image in which the block symbol of the process object that is outputting the alarm is located). The software subcomponent display alarm status DAS accordingly ensures all alarms of process objects that are present in the plant image affected by the server failure are received and only the alarm with the highest priority or the alarm that has a current date stamp and is not acknowledged is written into a display alarm status (DAS) tag that is configured to the plant image (for example, DAS: dosage in FIG. 1 for the plant image "Dosage"). In accordance with the invention, such a DAS tag is stored for each plant image according to a defined addressing convention. The display alarm status (DAS) tag is accordingly expanded by status information and coupled to the plant images. The status information is the alarm status for a limited operator control and monitoring in the absence of distributed process objects.

In this case, when it is clear for which plant image process objects are missing from other servers, an operator alarm P that indicates the limited operator control of the affected plant image is triggered by the alarm management component. The operator alarm is an alarm of a new alarm class P that is introduced for this purpose: "partially operable plant display" or "limited operator control". This alarm can be configured and can be provided with specific properties (for example, pink flashing). The alarm for reporting a limited operator control and monitoring is automatically stored as a type by the engineering in the process image. At run time, the alarm management component can then store instances thereof, i.e., actively trigger the alarm, for each problem that has been determined. When storing an alarm instance, the alarm management component fulfills the pre-configured alarm attributes, such as affected process objects in affected plant images.

In addition, via the software subcomponent display alarm status DAS, which manages the alarm status of plant images, the DAS tag is updated in the process image of the first OS server, where the tag characterizes the alarm status of the affected plant image. If the software subcomponent display alarm status DAS receives a new alarm for a process object of the plant image, then the alarm is compared with the DAS tag that is already available. Only if the new alarm is of the highest priority or has a current date stamp and is not acknowledged is the DAS tag overwritten. In this manner, the data structure of the DAS tag is always maintained up to date in its status, so that the operator is informed in principle instantaneously about the limited operator control. The software subcomponent display alarm status DAS is used in this case so to say as a tag manager that always checks which display alarm status is prevailing.

In conjunction with the affected plant image, reference is made to the graphical user interface UI of the OS client OS_C of the operator alarm P and the plant images for which not all process objects are available are identified. The triggered alarm for the new alarm class P is used to be able to illustrate, for example, in a group alarm display (GA in the display hierarchy of OS_C) that the operator control is limited for a specific plant image. As described, the display alarm status DAS tag is expanded by the alarm status for a limited operator control and monitoring in the absence of distributed process objects. Consequently, it is now also possible as illustrated to output a corresponding status (P with rose-red background) in the event that the affected plant image can only be partially operator controlled and monitored in the plant image hierarchy. In addition to the illustration in the plant image hierarchy (display hierarchy), it is furthermore also possible to provide an output in table format in a message sequence display (MFA in the plant image dosage of OS_C) and assume from this that there are plant images that although available can only be operator controlled and monitored in a limited manner, where it is also possible to observe a broadened context in this illustration.

A visualization service VS is integrated in the OS server OS_S1 and (visualization) data is transferred to the OS client OS_C via the visualization service. The visualization service is connected via interfaces "alarm DS" and "tag DS" to the data sources within the process image PI. The visualization service thus has available all the information that is known regarding the components of the process image in order to be able to transfer the information to a connected OS client for the graphical presentation.

The plant image hierarchy (display hierarchy DH_DL) that is included in the visualization service VS is responsible for the illustration of the image hierarchy (display hierarchy) on the OS client with all alarm statuses and logics. The visualization service VS comprises moreover the component PO_DL that is responsible for the illustration of the process objects POi. Block symbols that are associated with the process objects are illustrated in the plant image, (not shown in the figure), where the block symbols are provided for the process monitoring in order to display current process values and parameters during the process control.

The idea of this invention is furthermore that the availability of distributed process objects is to be taken into consideration when calculating the display alarm status DAS. If an alarm message of a distributed process object
- is not possible (for example, because an adjacent OS server is not available)
- is terminated (for example, because an adjacent OS server is no longer available), this is always indicated in the display alarm status DAS and coded accordingly (for example pink flashing) by the properties of an alarm class that is introduced for this purpose (P-partially operable plant display).

Furthermore, an alarm of the alarm class P that is introduced by this invention is reported. An alarm of the alarm class P provides still further context with regard to partially limited operator control and monitoring than is provided for the display alarm status tag, such as
- the time periods in which a limited operator control and monitoring is prevailing or has prevailed,
- the process objects that have brought about a limited operator control and monitoring,
- the OS servers that have the process objects in the process image that have brought about a limited operator control and monitoring.

It is consequently possible in the absence of distributed process objects to individually determine and also individually identify the plant images that are affected thereby and that can consequently only be partially operator controlled or monitored, with the result that it is possible for information for operators to be provided at multiple sites in an OS client. It is possible by virtue of storing and correspondingly archiving the display alarm status tag and the newly introduced alarm to also follow historically the limited operator control and monitoring which is of great importance for subsequent examinations of dangerous situations.

FIG. 2 is a flowchart of the method for identifying a limited operator control and monitoring of a technical plant in which a process is controlled via a process control system PL including at least two operator station servers OS_S1, OS_S2 and at least one operator station client OS_C, and in which process objects POi associated with the process are distributed on process images PI of different operator station servers OS_S1, OS_S2 of the process control system PL, and for process monitoring a graphical user interface UI is provided on the operator station client OS_C for displaying plant images with symbols associated with the process objects POi.

The method comprises determining, via a component D of a first operator station server OS_S1, whether a different operator station server OS_S2 of the process control system PL has failed, as indicated in step 210.

Next, a failure of the different server OS_S2 is reported to an alarm management component AM of at least the first of the operator station servers OS_S1, as indicated in step 220.

Next, a check is performed by the alarm management component AM to determine whether plant images which include process objects from the process image of the failed server OS_S2 are stored on the first operator station server OS_S1 and which plant images are affected by the server failure, as indicated in step 230.

In this case, an operator alarm P is triggered which informs the operator that operator control of the affected plant image is limited, as indicated in step 240.

Next, a tag that characterizes an alarm status of the affected plant image is updated in the process image PI of the first operator station server OS_S1 via a component DAS that manages an alarm status of plant images, as indicated in step 250.

Next, the operator alarm P is displayed on the graphical user interface UI of the operator station client OS_C in conjunction with the affected plant image, as indicated in step 260.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for identifying a limited operator control and monitoring of a technical plant in which a process is controlled via a process control system including at least two operator station servers and at least one operator station client, and in which process objects associated with the process are distributed on process images of different operator station servers of the process control system, and for process monitoring a graphical user interface is provided on the operator station client for displaying plant images with symbols associated with the process objects, the method comprising:

determining, via a component of a first operator station server, whether a different operator station server of the process control system has failed;

reporting a failure of the different server to an alarm management component of at least the first of the operator station servers;

performing a check, by the alarm management component, to determine whether plant images which include process objects from the process image of the failed server are stored on the first operator station server and which plant images are affected by the server failure;

triggering, in this case, an operator alarm which informs the operator that operator control of the affected plant image is limited;

updating in the process image of the first operator station server, via a component which manages an alarm status of plant images, a tag which characterizes an alarm status of the affected plant image; and displaying the operator alarm on the graphical user interface of the operator station client in conjunction with the affected plant image.

2. The method as claimed in claim 1, wherein, so as to display the operator alarm on the graphical user interface of the client, the updated tag is reported in the case of the visualization service via a tag interface, and the operator alarm is taken into consideration via the component display hierarchy in all displays as an alarm of its own class.

3. The method as claimed in claim 2, wherein the operator alarm is configurable.

4. The method as claimed in claim 2, wherein the operator alarm is displayed in a separate display or the display of the operator alarm is provided together with process alarms in group alarm displays or message sequence displays.

5. The method as claimed in claim 1, wherein the operator alarm is configurable.

6. The method as claimed in claim 1, wherein the operator alarm is displayed in a separate display or the display of the operator alarm is provided together with process alarms in group alarm displays or message sequence displays.

7. The method as claimed in claim 1, wherein the tag of the alarm status of the affected plant image is updated in the process image at run time of the control system in real time or with each cycle or in an event-controlled manner.

8. The method as claimed in claim 1, wherein a status of the tag is stored in dependence upon time in order to determine time periods in which operator control is limited.

9. The method as claimed in claim 8, wherein at least one of (i) in addition the process objects that have brought about a limited operator control are additionally stored and (ii) statistics regarding the process objects, process images and server that have brought about a limited operator control are generated.

10. The operator control and monitoring system as claimed in claim 8, wherein the operator alarm is displayed in a separate display or the display of the operator alarm is provided together with process alarms in group alarm displays or message sequence displays.

11. An operator control and monitoring system for a process control system which controls a process in a technical plant, comprising:
- at least one operator station client; and
- at least two operator station servers which are interconnected via at least one communication means, each operator station server having a process image which includes process objects associated with the process;
- wherein a graphical user interface is provided on the operator station client for displaying plant images with (block) symbols that are associated with the process objects and for process monitoring;
- wherein a first component of the first operator station server is configured to determine whether a different operator station server of the process control system has failed,
- wherein an alarm management component of the first operator station server is connected to the first component and is configured so as according to information regarding the failure of the different operator station server to check whether plant images which include process objects from the process image of the failed server are stored on the first operator station server and configured to check which plant images are consequently affected by the server failure and, in this case, trigger a configurable operator alarm which informs the operator that operator control of the affected plant image is limited; and
- wherein a further component which manages an alarm status of plant images is connected to the alarm management component and is configured to update, in the process image, a tag of the alarm status of the affected plant image and to bring about via a visualization service that, in conjunction with the affected plant image, the operator alarm is displayed on the graphical user interface of the operator station client.

12. The operator control and monitoring system as claimed in claim 11, wherein the operator station server includes further components that are configured to:
- display the operator alarm on the graphical user interface of the client, the updated tag is reported in the case of the visualization service via a tag interface, and the operator alarm is taken into consideration via the component display hierarchy in all displays as an alarm of its own class.

13. A process control system for controlling a process in a technical plant which include an operator control and monitoring system as claimed in claim 12.

14. The operator control and monitoring system as claimed in claim 11, wherein the operator alarm is configurable.

15. The operator control and monitoring system as claimed in claim 11, wherein the tag of the alarm status of the affected plant image is updated in the process image at run time of the control system in real time or with each cycle or in an event-controlled manner.

16. The operator control and monitoring system as claimed in claim 11, wherein a status of the tag is stored in dependence upon time in order to determine time periods in which operator control is limited.

17. The operator control and monitoring system as claimed in claim 11, wherein at least one of (i) in addition the process objects that have brought about a limited operator control are additionally stored and (ii) statistics regarding the process objects, process images and server that have brought about a limited operator control are generated.

18. A process control system for controlling a process in a technical plant which include an operator control and monitoring system as claimed in claim 11.

* * * * *